(12) United States Patent
Matsunaga

(10) Patent No.: US 8,439,097 B2
(45) Date of Patent: May 14, 2013

(54) PNEUMATIC TIRE AND MANUFACTURING METHOD THEREFOR

(75) Inventor: Futoshi Matsunaga, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 626 days.

(21) Appl. No.: 12/636,251

(22) Filed: Dec. 11, 2009

(65) Prior Publication Data

US 2010/0147440 A1 Jun. 17, 2010

(30) Foreign Application Priority Data

Dec. 15, 2008 (JP) .................................. 2008-318579

(51) Int. Cl.
*B60C 5/14* (2006.01)
(52) U.S. Cl.
USPC .......................................... 152/510; 152/157
(58) Field of Classification Search .................. 152/510; B60C 5/14
See application file for complete search history.

(56) References Cited

U.S. PATENT DOCUMENTS

2010/0024941 A1* 2/2010 Hara et al. .................... 152/510

FOREIGN PATENT DOCUMENTS

EP 2058142 A1 * 5/2009

OTHER PUBLICATIONS

Wikipedia entry for Polyethylene, accessed Jun. 28, 2012.*

* cited by examiner

*Primary Examiner* — Richard Crispino
*Assistant Examiner* — Philip N Schwartz
(74) *Attorney, Agent, or Firm* — Novak Druce Connolly Bove + Quigg LLP

(57) ABSTRACT

Provided is a pneumatic tire and a manufacturing method therefor which allow a reduction in a cavity resonance sound without complicated manufacturing steps. A pneumatic tire of the present invention includes: a pair of bead portions; a carcass layer bridged between the pair of bead portions; and an inner liner layer disposed at a tire inner surface side of the carcass layer, the inner liner layer being made of a thermoplastic resin or a thermoplastic elastomer composition obtained by blending a thermoplastic resin with an elastomer. The inner liner layer has a laminated structure including multiple film layers having different melting points of the thermoplastic resin from each other. The film layer having the lowest melting point of the thermoplastic resin is foamed to form multiple convex portions in the tire inner surface.

5 Claims, 2 Drawing Sheets

PNEUMATIC TIRE AND MANUFACTURING METHOD THEREFOR

CROSS REFERENCE TO RELATED APPLICATIONS

This application claims priority to JP 2008-318579 filed Dec. 15, 2008, the entire content of which is hereby incorporated by reference.

BACKGROUND OF THE INVENTION

1. Field of the Invention

The present invention relates to a pneumatic tire and a manufacturing method therefor, the pneumatic tire including: a carcass layer bridged between a pair of bead portions; and an inner liner layer disposed at a tire inner surface side of the carcass layer, the inner liner layer being made of a thermoplastic resin or a thermoplastic elastomer composition obtained by blending a thermoplastic resin with an elastomer. More particularly, the present invention relates to a pneumatic tire and a manufacturing method therefor which allow a reduction in a cavity resonance sound without complicated manufacturing steps.

2. Description of the Related Art

A cavity resonance phenomenon that occurs in a cavity portion formed between a pneumatic tire and a rim of a wheel has been a major cause of tire noises. For example, the cavity resonance phenomenon is involved in: a noise having a frequency of around a 250 Hz, which is heard consistently during running; and an impact sound which is generated when the tires run over a joint in a road, or the like.

Conventionally, as a proposed technique for reducing a noise due to such a cavity resonance phenomenon, a rubber-made partition plate extending in a tire width direction is attached to a tire inner surface. Thereby, the cavity resonance mode is changed to reduce the sound pressure level (for example, Japanese patent application Kokai publication No. Hei. 5-294102). However, when such a rubber-made partition plate is attached to the tire inner surface after curing, a mold releasing agent used during the curing may have adhered to the tire inner surface, or the uneven pattern of a curing bladder may have been transferred to the tire inner surface. Accordingly, the partition plate tends to be attached incompletely. For this reason, repeated deformation of the tire due to the rolling thereof causes the partition plate to be detached from the tire inner surface after an extended period of use. As a result, this technique has a durability problem and also has a problem that it is difficult to keep the noise-reducing effect over an extended period.

As this countermeasure, the following proposals have been made. In one of the proposals, first, a film made of a material mainly composed of a thermoplastic resin is folded. The film having the folded portions is used to form an inner liner layer. Then, the folded portions are erected inward in a tire radial direction after the tire is cured. In another proposal, a film made of a material mainly composed of a thermoplastic resin is used to form an inner liner layer. Then, thin films made of the same material as that of the inner liner layer are thermally fused with the inner liner layer to serve as partition plates (for example, Japanese patent application Kokai publication No. 2007-62541). However, the operation of erecting the folded portions and the operation of thermally fusing the thin films are complicated. These techniques have not been practically adopted yet.

SUMMARY OF THE INVENTION

An object of the present invention is to provide a pneumatic tire and a manufacturing method therefor which allow a reduction in a cavity resonance sound without complicated manufacturing steps.

The pneumatic tire of the present invention to accomplish the above object is characterized as follows. Specifically, the pneumatic tire includes: a pair of bead portions; a carcass layer bridged between the pair of bead portions; and an inner liner layer disposed at a tire inner surface side of the carcass layer, the inner liner layer being made of a thermoplastic resin or a thermoplastic elastomer composition that is obtained by blending a thermoplastic resin with an elastomer. The inner liner layer has a laminated structure including multiple film layers having different melting points of the thermoplastic resin from each other. A film layer having a lowest melting point of the thermoplastic resin is foamed to form multiple convex portions in the tire inner surface.

Moreover, the manufacturing method for a pneumatic tire of the present invention to accomplish the above object is characterized as follows. Specifically, the manufacturing method includes: bridging a carcass layer between a pair of bead portions; disposing an inner liner layer at a tire inner surface side of the carcass layer, the inner liner layer being made of any one of a thermoplastic resin and a thermoplastic elastomer composition that is obtained by blending a thermoplastic resin with an elastomer; building an uncured tire in which the inner liner layer has a laminated structure including multiple film layers having different melting points of the thermoplastic resin from each other; curing the uncured tire while pressurizing the tire from an inside thereof; and, in depressurizing the tire after the curing, foaming a film layer having a lowest melting point of the thermoplastic resin to thus form multiple convex portions in the tire inner surface.

In the present invention, the inner liner layer is formed to have the laminated structure including the multiple film layers having different melting points of the thermoplastic resin from each other. The film layer having the lowest melting point of the thermoplastic resin is foamed to form the multiple convex portions in the tire inner surface. In this way, a cavity resonance sound is reduced owing to these convex portions. Moreover, a film layer other than the film layer having the lowest melting point of the thermoplastic resin keeps having the air-permeation prevention function required for the inner liner layer. Here, in order to foam the film layer having the lowest melting point of the thermoplastic resin, the melting point should be as approximate to the curing temperature as possible. This allows a reduction in a cavity resonance sound without complicated manufacturing steps.

In the present invention, it is preferable that a film layer having a highest melting point of the thermoplastic resin have a melting point set in a range of 175° C. to 250° C., and that a difference in melting point between the film layer having the highest melting point of the thermoplastic resin and the film layer having the lowest melting point of the thermoplastic resin be 5° C. or larger. This makes it easy to set such a curing temperature that the film layer having the highest melting point of the thermoplastic resin may not be foamed whereas the film layer having the lowest melting point of the thermoplastic resin may be foamed.

The film layer having the lowest melting point of the thermoplastic resin is preferably kneaded with a filler. The filler serves as the core of foaming. The addition of the filler to the film layer having the lowest melting point of the thermoplastic resin promotes the foaming of the film layer.

It is preferable that the film layer having the highest melting point of the thermoplastic resin be disposed closest to the carcass layer, and that the film layer having the lowest melting point of the thermoplastic resin be disposed farthest from the carcass layer. Thereby, the effect of reducing a cavity resonance sound is obtained while the air-permeation prevention function is favorably kept.

A rubber layer is preferably disposed at a tire inner surface side of the inner liner layer. By stacking such a rubber layer on the inner liner layer, air bubbles are prevented from being burst immediately after the film layer having the lowest melting point of the thermoplastic resin is foamed.

The film layer having the lowest melting point of the thermoplastic resin can be disposed partially in a tire circumferential direction. In this case, the cross-sectional area of a cavity portion formed between the pneumatic tire and a rim of a wheel varies in the tire circumferential direction. Thus, a cavity resonance sound is effectively reduced in accordance with the variation in the cross-sectional area.

In the manufacturing method for a pneumatic tire according to the present invention, when the uncured tire is cured without a bladder, there is no means for pressing the film layer having the lowest melting point of the thermoplastic resin at the time of the depressurization after the curing. As a result, the manufacturing method of the present invention has an advantage that the film layer is readily foamed.

DETAILED DESCRIPTION OF THE PREFERRED EMBODIMENT

Figure 1:
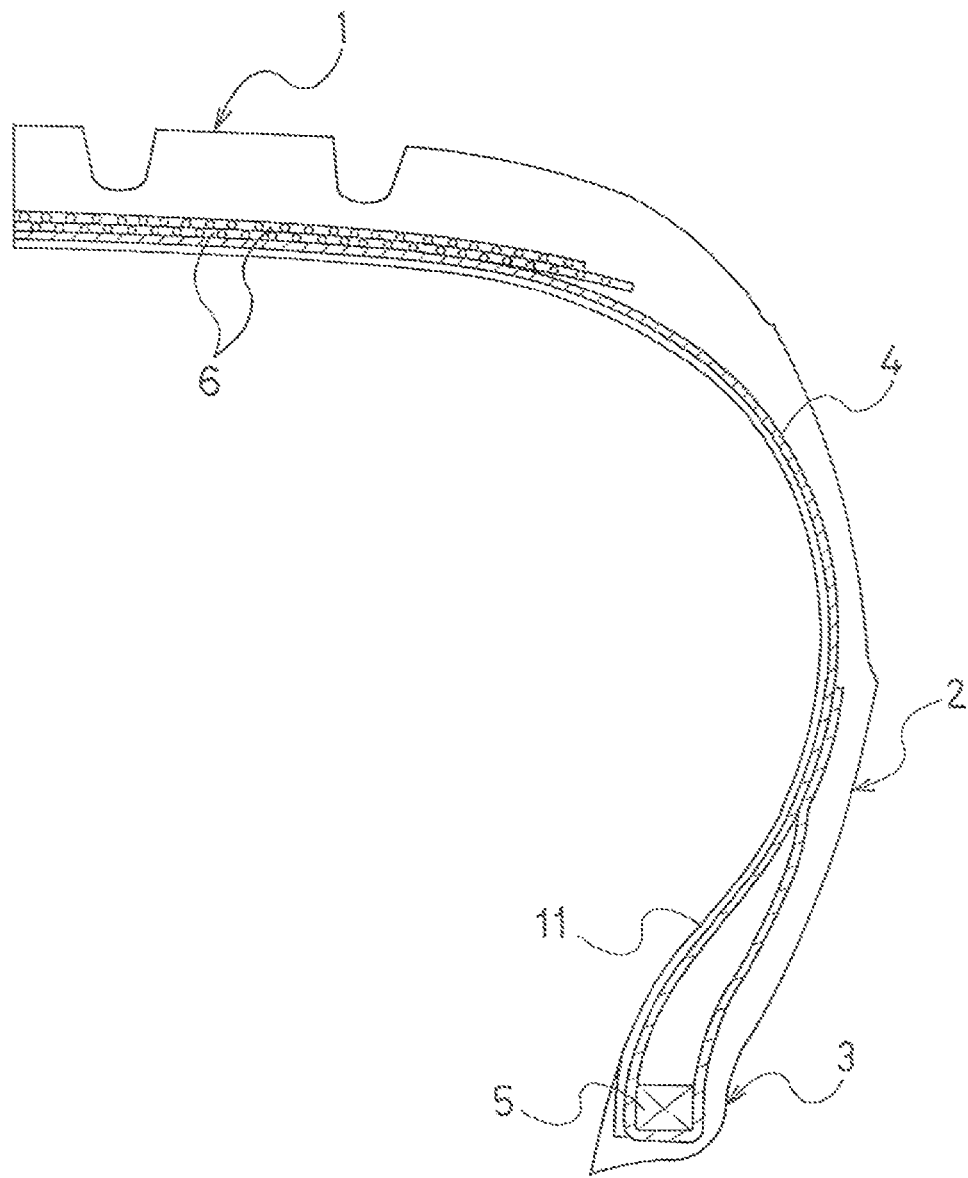
FIG. 1 is a meridian half cross-sectional view showing a pneumatic tire according to an embodiment of the present invention.
Figure 2:
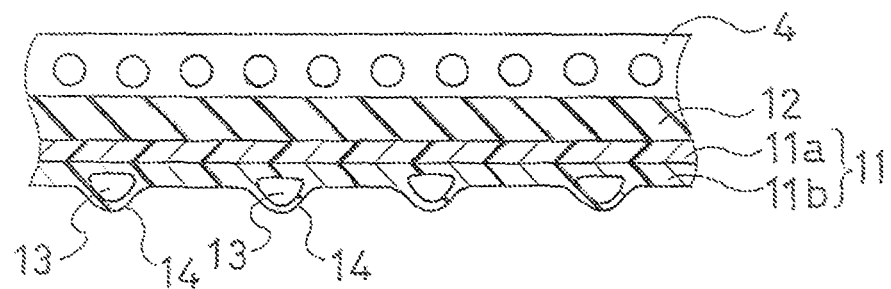
FIG. 2 is a cross-sectional view showing a principal portion of the pneumatic tire in FIG. 1.

Hereinafter, a constitution of the present invention will be described in detail with reference to the attached drawings. FIG. 1 shows a pneumatic tire according to an embodiment of the present invention. FIG. 2 shows an enlarged principal portion thereof. In FIG. 1, reference numeral 1 denotes a tread portion, 2 denotes a sidewall portion, and 3 denotes a bead portion. A carcass layer 4 including multiple reinforcing cords is bridged between a pair of left and right bead portions 3, 3. The carcass layer 4 is wound up around a bead core 5 from the inner side of the tire to the outer side thereof. Meanwhile, at the outer circumferential side of the carcass layer 4, multiple belt layers 6 are buried in the tread portion 1. These belt layers 6 are disposed in a way that reinforcing cords of the belt layers 6 incline relative to a tire circumferential direction while the reinforcing cords of the respective belt layers 6 intersect on top of each other.

In the pneumatic tire, along the carcass layer 4, an inner liner layer (air-permeation preventing layer) 11 is disposed at a tire inner surface side of the carcass layer 4. In FIG. 2, a tie rubber layer 12 is inserted between the inner liner layer 11 and the carcass layer 4 to ensure the adhesiveness of the two.

The inner liner layer 11 is made of a thermoplastic resin or a thermoplastic elastomer composition. More specifically, the inner liner layer 11 has a laminated structure including multiple film layers 11a, 11b having different melting points of the thermoplastic resin from each other. Here, the film layer 11a has the higher melting point of the thermoplastic resin of the two, and is disposed to be the closer to the carcass layer 4 of the two. Meanwhile, the film layer 11b has the lower melting point of the thermoplastic resin of the two, and is disposed to be the farther from the carcass layer 4 of the two. The film layer 11b having the lower melting point includes air bubbles 13 formed by foaming. As a result, multiple convex portions 14 are formed in the tire inner surface.

As described above, the inner liner layer 11 is formed to have the laminated structure including the multiple film layers 11a, 11b having different melting points of the thermoplastic resin from each other. The film layer 11b having the lower melting point of the thermoplastic resin is foamed to form the multiple convex portion 14 in the tire inner surface. In this way, a cavity resonance sound is reduced owing to these convex portions 14. In order to sufficiently obtain the effect of reducing a cavity resonance sound, each of the convex portions 14 should have a height of 0.5 mm or greater, and preferably 1.5 mm to 5.0 mm. On the other hand, the film layer other than the film layer 11b having the lower melting point of the thermoplastic resin, i.e., the film layer 11a, keeps having the air-permeation prevention function required for the inner liner layer 11.

The above-described pneumatic tire is manufactured as follows. First, the carcass layer 4 is bridged between the pair of the bead portions 3, 3 while the inner liner layer 11 is disposed at the tire inner surface side of the carcass layer 4. Then, an uncured tire is built in which the inner liner layer 11 has the laminated structure including the multiple film layers 11a, 11b having different melting points of the thermoplastic resin from each other. Thereafter, the uncured tire is cured while being pressurized from the inside thereof. After that, in depressurizing the tire after the curing, the film layer 11b having the lower melting point of the thermoplastic resin is foamed to form the multiple convex portions 14 in the tire inner surface. Particularly, when the uncured tire is cured without a bladder, there is no means for pressing the film layer 11b having the lower melting point of thermoplastic resin at the time of the depressurization after the curing. Accordingly, the film layer 11b having the lower melting point is readily foamed.

Normally, a tire is cured in a temperature range of 150° C. to 200° C. In consideration of such a curing temperature, the film layer 11a having the higher melting point of the thermoplastic resin should be set to have a melting point in a range of 175° C. to 250° C. Thereby, foaming of the film layer 11a having the higher melting point is avoided. Meanwhile, the film layer 11b having the lower melting point of the thermoplastic resin should be set to have a melting point in a range of 70° C. to 200° C. The difference in melting point between the film layer 11a having the higher melting point of the thermoplastic resin and the film layer 11b having the lower melting point of the thermoplastic resin should be 5° C. or larger, and preferably 10° C. or larger. This makes it easy to set such a curing temperature that the film layer 11a having the higher melting point of the thermoplastic resin may not be foamed whereas the film layer 11b having the lower melting point of the thermoplastic resin may be foamed. Moreover, the film layer 11b having the lower melting point of the thermoplastic resin should have a melting point equal to or lower than the curing temperature. The difference between the melting point and the curing temperature is further preferably 10° C. or larger. When the melting point of the film layer 11b having the lower melting point of the thermoplastic resin is set equal to or lower than the curing temperature in this manner, air included in the film layer 11b is allowed to expand at the time of the depressurization after the curing. As a result, the multiple convex portions 14 are formed in the tire inner surface.

The relationship between the film layers 11a, 11b in terms of inner and outer positions with respect to each other is not particularly limited. However, as in the above-described embodiment, the film layer 11a having the higher melting point of the thermoplastic resin should be disposed to be the closer to the carcass layer 4 of the two, whereas the film layer 11b having the lower melting point of the thermoplastic resin should be disposed to be the farther from the carcass layer 4 of the two. Thereby, the air-permeation prevention function owing to the film layer 11a is stabilized, and furthermore the large convex portions 14 are formed due to the foaming. Thus, the effect of reducing a cavity resonance sound is increased. In this case, the film layer 11a having the higher melting point desirably has a thickness larger than that of the film layer 11b having the lower melting point. In addition, the film layer 11a having the higher melting point desirably has a thickness of 1 μm to 700 μm, the film layer 11b having the lower melting point desirably has a thickness of 1 μm to 700 μm (at a portion where no convex portion exists), and the inner liner layer 11 desirably has a total thickness of 2 μm to 1000 μm (at the portion where no convex portion exists).

Figure 3:
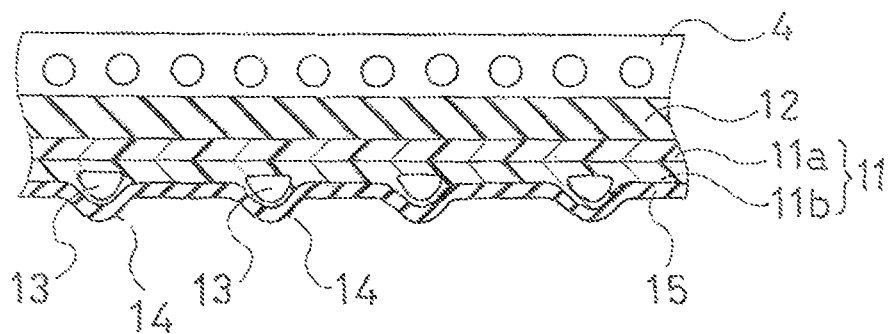
FIG. 3 is a cross-sectional view showing a principal portion of a pneumatic tire according to another embodiment of the present invention.

FIG. 3 shows an enlarged principal portion of a pneumatic tire according to another embodiment of the present invention. In FIG. 3, an inner liner layer 11 is disposed at a tire inner surface side of a carcass layer 4 with a tie rubber layer 12 interposed therebetween. The inner liner layer 11 has a laminated structure including multiple film layers 11a, 11b having different melting points of the thermoplastic resin from each other. Moreover, a rubber layer 15 is disposed at a tire inner surface side of the inner liner layer 11. By stacking the rubber layer 15 at the tire inner surface side of the inner liner layer 11, the air bubbles are prevented from being burst immediately after the film layer 11b having the lower melting point of thermoplastic resin is foamed. The rubber layer 15 preferably includes a butyl rubber having a low air permeability. If the rubber layer 15 has a thickness of at least 0.1 mm, the aforementioned effect is obtained. Meanwhile, the rubber layer 15 is preferably set to have a thickness of 0.15 mm to 1.00 mm. If the surface of the inner liner layer 11 is covered with a soft rubber layer, the cavity resonance attenuating effect is obtained, which is thus further preferable.

In the embodiments described above, the descriptions have been given of the case where the laminated structure including the film layers 11a, 11b is formed on the entire region of the inner liner layer. However, in the present invention, the film layer 11b having the lower melting point of the thermoplastic resin can be disposed partially in the tire circumferential direction. For example, the film layer 11b having the lower melting point can be disposed periodically and intermittently in the tire circumferential direction. In this case, the cross-sectional area of a cavity portion formed between the pneumatic tire and a rim of a wheel varies in the tire circumferential direction. Thus, a cavity resonance sound is effectively reduced in accordance with the variation in the cross-sectional area.

Moreover, in the embodiments, the descriptions have been given of the case where the inner liner layer is formed of two kinds of film layers having different melting points of the thermoplastic resin from each other. However, in the present invention, the inner liner layer can be formed of three or more kinds of film layers having different melting points of the thermoplastic resin from each other. In this case also, the above-described constitution should be employed for a film layer having the highest melting point of the thermoplastic resin and for a film layer having the lowest melting point of the thermoplastic resin. A film layer having an intermediate melting point may have a structure with or without air bubbles.

Hereinafter, description will be given of a thermoplastic resin or a thermoplastic elastomer composition used for the inner liner layer in the present invention. The inner liner layer can be formed of a thermoplastic resin or a thermoplastic elastomer composition obtained by blending a thermoplastic resin with an elastomer.

Examples of the thermoplastic resin preferably used in the present invention include: polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6 (MXD6), nylon 6T, nylon 6/6T copolymers, nylon 66/PP copolymers, and nylon 66/PPS copolymers); their N-alkoxyalkylated products (for example, methoxymethylated nylon 6, methoxymethylated nylon 6/610 copolymers, and methoxymethylated nylon 612); polyester resins (for example, aromatic polyesters, such as polybutylene terephthalate (PBT), polyethylene terephthalate (PET), polyethylene isophthalate (PEI), PET/PEI copolymers, polyarylate (PAR), polybutylene naphthalate (PBN), liquid crystal polyester, and polyoxyalkylene diimide diacid/polybutylene terephthalate copolymers); polynitrile resins (for example, polyacrylonitrile (PAN), polymethacrylonitrile, acrylonitrile/styrene copolymers (AS), (meth)acrylonitrile/styrene copolymers, and (meth)acrylonitrile/styrene/butadiene copolymers); polymethacrylate resins (for example, polymethyl methacrylate (PMMA), polyethyl methacrylate); polyvinyl resins (for example, polyvinyl acetate, polyvinyl alcohol (PVA), vinyl alcohol/ethylene copolymers (EVOH), polyvinylidene chloride (PVDC), polyvinyl chloride (PVC), vinyl chloride/vinylidene chloride copolymers, vinylidene chloride/methyl acrylate copolymers, vinylidene chloride/acrylonitrile copolymers); cellulose resins (for example, cellulose acetate, and cellulose acetate butyrate); fluororesins (for example, polyvinylidene fluoride (PVDF), polyvinyl fluoride (PVF), polychlorotrifluoroethylene (PCTFE), and ethylene/tetrafluoroethylene (ETFE) copolymers); and imide resins (for example, aromatic polyimide (PI)).

Examples of the elastomer preferably used in the present invention include: diene rubbers and their hydrogenated products (for example, natural rubbers (NR), isoprene rubber (IR), epoxidized natural rubbers, styrene-butadiene rubber (SBR), butadiene rubbers (BR, high-cis BR and low-cis BR), nitrile rubber (NBR), hydrogenated NBR, and hydrogenated SBR); olefin rubbers (for example, ethylene propylene rubbers (EPDM and EPM), maleic acid-modified ethylene/alfa-olefin copolymerized rubber, maleic acid-modified ethylene propylene rubber (M-EPM), butyl rubber (IIR), copolymers of isobutylene and aromatic vinyl or diene monomer, acrylic rubber (ACM), and ionomers); halogen-containing rubbers (for example, Br-IIR, Cl-IIR, brominated isopropylene-p-methylstyrene copolymers, brominated isobutylene-p-methylstyrene copolymers (Br-IPMS), chloroprene rubber (CR), hydrin rubber (CHR), chlorosulfonated polyethylene rubber (CSM), chlorinated polyethylene rubber (CM), and maleic acid-modified chlorinated polyethylene rubber (M-CM)); silicone rubbers (for example, methyl vinyl silicone rubber, dimethyl silicone rubber, and methylphenylvinyl silicone rubber); sulfur-containing rubbers (for example, polysulfide rubber); fluororubbers (for example, vinylidene fluoride rubbers, fluorine-containing vinyl ether rubbers, tetrafluoroethylene-propylene rubbers, fluorine-containing silicone rubbers, and fluorine-containing phosphazene rubbers); and thermoplastic elastomers (for example, styrene elastomers, olefin elastomers, ester elastomers, urethane elastomers, and polyamide elastomers).

If a particular thermoplastic resin among those described above is incompatible with such an elastomer, a compatibilizer may be used as a third component appropriately to make the two compatible with each other. By mixing such a compatibilizer into the blend system, the interfacial tension between the thermoplastic resin and the elastomer is reduced. As a result, the rubber particles constituting the dispersion phase is made finer, so that both components can exhibit their characteristics more effectively. In general, such a compatibilizer has a copolymer structure of at least one of the thermoplastic resin and the elastomer, or a copolymer structure having an epoxy group, a carbonyl group, a halogen group, an amino group, an oxazoline group, or a hydroxyl group, which is capable of reacting with the thermoplastic resin or the elastomer. The compatibilizer can be selected depending on the type of the thermoplastic resin and the elastomer to be mixed therewith. What is normally used is styrene/ethylene-butylene-styrene block copolymers (SEBS) and their maleic acid-modified products, EPDM, EPM, EPDM/styrene or EPDM/acrylonitrile graft copolymers and their maleic acid-modified products, styrene/maleic acid copolymers, reactive phenoxine, and the like. The blending proportion of such a compatibilizer is not particularly limited, but may preferably be 0.5 to 10 parts by weight relative to 100 parts by weight of the polymer components (the total amount of the thermoplastic resin and the elastomer).

In the thermoplastic elastomer composition, the component ratio of a particular thermoplastic resin to a particular elastomer is not particularly limited, and may be appropriately set so as to have a structure in which the elastomer is dispersed as a discontinuous phase in a matrix of the thermoplastic resin. However, the preferable range is 90/10 to 30/70 in weight ratio.

In the present invention, the thermoplastic resin and the thermoplastic elastomer composition each of which constitutes the air-permeation preventing layer may be mixed with another polymer, for example, the above-described compatibilizer in such an amount that the polymer does not harm the characteristic required as the members of the tire. The purposes of mixing such a polymer are to improve the compatibility between the thermoplastic resin and the elastomer, to improve the molding processability of the material for the film, to improve the heat resistance, to reduce cost, and so on. Examples of the material used for the polymer include polyethylene (PE), polypropylene (PP), polystyrene (PS), ABS, SBS, and polycarbonate (PC). In addition, a filler (calcium carbonate, titanium oxide, alumina, talc, talc clay, or the like) generally blended with a polymer blend, a reinforcement such carbon black and white carbon, a softener, a plasticizer, a processing aid, a pigment, a dye, an antidegradant, or the like can be blended optionally as long as such an agent does not harm the characteristic required as the members of the tire. Especially, the filler serves as the core of foaming. Therefore, the addition of the filler to the film layer promotes the foaming.

When mixed with the thermoplastic resin, the elastomer can be dynamically vulcanized. A vulcanizer, a vulcanization assistant, vulcanization conditions (temperature, time), and the like, during the dynamic vulcanization can be determined as appropriate in accordance with the composition of the elastomer to be added, and are not particularly limited.

As the vulcanizer, a generally-available rubber vulcanizer (crosslinking agent) can be used. Specifically, examples of a sulfur-based vulcanizer include a sulfur powder, precipitated sulfur, highly dispersible sulfur, surface-treated sulfur, non-soluble sulfur, dimorpholin disulfide, and alkylphenol disulfide. Such a vulcanizer can be used in an amount of, for example, approximately 0.5 to 4 phr (hereinafter, "phr" refers to parts by weight per 100 parts by weight of the elastomer component).

Moreover, examples of an organic peroxide-based vulcanizer include benzoyl peroxide, t-butyl hydroperoxide, 2,4-dichlorobenzoyl peroxide, 2,5-dimethyl-2,5-di(t-butyl peroxy)hexane, and 2,5-dimethylhexane-2,5-di(peroxyl benzoate). Such an organic peroxide-based vulcanizer can be used in an amount of, for example, approximately 1 to 20 phr.

Furthermore, examples of a phenol resin-based vulcanizer includes brominated alkylphenol resins and mixed crosslinking system containing an alkyl phenol resin with a halogen donor such as tin chloride and chloroprene. Such a phenol resin-based vulcanizer can be used in an amount of, for example, approximately 1 to 20 phr.

Examples of other vulcanizers include zinc white (approximately 5 phr), magnesium oxide (approximately 4 phr), litharge (approximately 10 to 20 phr), p-quinone dioxime, p-dibenzoylquinone dioxime, tetrachloro-p-benzoquinone, poly-p-dinitrosobenzene (approximately 2 to 10 phr), and methylenedianiline (approximately 0.2 to 10 phr).

As necessary, a vulcanization accelerator may be added. Examples of the vulcanization accelerator are aldehyde-ammonia-based, guanidine-based, thiazole-based, sulfenamide-based, thiuram-based, dithioic acid salt-based, and thiourea-based vulcanization accelerators which are generally available. Such a vulcanization accelerator can be used in an amount of, for example, approximately 0.5 to 2 phr.

Specifically, an example of the aldehyde-ammonia-based vulcanization accelerator includes hexamethylenetetramine. An example of the guanidine-based vulcanization accelerator includes diphenylguanidine. Examples of the thiazole-based vulcanization accelerator include dibenzothiazyl disulfide (DM), 2-mercapto benzothiazole and their Zn salts, and cyclohexylamine salts. Examples of the sulfenamide-based vulcanization accelerator include cyclohexylbenzothiazyl sulfenamide (CBS), N-oxydiethylenebenzothiazyl-2-sulfenamide, N-t-butyl-2-benzothiazole sulfenamide, and 2-(thymolpolynyldithio)benzothiazole. Examples of the thiuram-based vulcanization accelerator include tetramethylthiuram disulfide (TMTD), tetraethylthiuram disulfide, tetramethylthiuram monosulfide (TMTM), and dipentamethylenethiuram tetrasulfide. Examples of the dithioic acid salt-based vulcanization accelerator include Zn-dimethyldithiocarbamate, Zn-diethyldithiocarbamate, Zn-di-n-butyldithiocarbamate, Zn-ethylphenyldithiocarbamate, Te-diethyldithiocarbamate, Cu-dimethyldithiocarbamate, Fe-dimethyldithiocarbamate, and pipecoline pipecolyldithiocarbamate. Examples of the thiourea-based vulcanization accelerator include ethylene thiourea and diethylthiourea.

Additionally, a vulcanization accelerator assistant which is generally-used for a rubber can be used. For example, zinc white (approximately 5 phr), stearic acid, oleic acid and their Zn salts (approximately 2 to 4 phr), or the like can be used.

The method for producing the thermoplastic elastomer composition is as follows. The thermoplastic resin and the elastomer (unvulcanized one in the case of rubber) are melt-kneaded in advance by a bi-axial kneader/extruder or the like. The elastomer is dispersed as a dispersion phase (domain) in the thermoplastic resin forming a continuous phase (matrix). When the elastomer is vulcanized, the vulcanizer can be added during the kneading process to dynamically vulcanize the elastomer. Although the various compounding agents (except for vulcanizer) may be added to the thermoplastic resin or the elastomer during the kneading process, it is preferable to premix the compounding agents before the kneading process. The kneader used for kneading the thermoplastic resin and the elastomer is not particularly limited. A screw extruder, kneader, Banbury Mixer, bi-axial kneader/extruder, or the like can be used as the kneader. Among these, a bi-axial kneader/extruder is preferably used for kneading the thermoplastic resin and the elastomer and for dynamically vulcanizing the elastomer. Furthermore, two or more types of kneaders can be used to successively knead the thermoplastic resin and the elastomer. As the condition for the melt kneading, the temperature should be at a temperature at which the thermoplastic resin melts or at a higher temperature. The shear rate at the time of kneading is preferably 1000 to 7500 $sec^{-1}$. The overall kneading time is 30 seconds to 10 minutes. When the vulcanizer is added, the vulcanization time after the addition is preferably 15 seconds to 5 minutes. The polymer composition produced by the above method may be formed into a desired shape by a generally-used method for forming a thermoplastic resin such as injection molding and extrusion molding.

The thermoplastic elastomer composition thus obtained has a structure in which the elastomer is dispersed as a discontinuous phase in the matrix of the thermoplastic resin. By adopting such a structure, it becomes possible to provide the members of the tire with both sufficient flexibility and sufficient stiffness that is attributed to the effect of the resin layer as the continuous phase. Furthermore, it becomes possible to obtain, in molding, a molding processability equivalent to the case of a thermoplastic resin regardless of the amount of elastomer.

The storage elastic moduli at 20° C. of the thermoplastic resin and the thermoplastic elastomer composition are not particularly limited, but are preferably set to 1 to 500 MPa, and more preferably 50 to 500 MPa.

The thermoplastic resin or the thermoplastic elastomer composition can be formed into a sheet or film to be used as a single unit. Alternatively, an adhesive layer may be stacked thereon in order to improve the adhesiveness to the adjacent rubber. Specific examples of an adhesive polymer that constitutes the adhesive layer include an ultra high molecular weight polyethylene (UHMWPE) having a molecular weight of 1,000,000 or more, preferably 3,000,000 or more, acrylate copolymers such as ethylene-ethylacrylate copolymers (EEA), ethylene-methylacrylate resins (EMA) and ethylene-acrylic acid copolymers (EAA), and their maleic anhydrate adduct, polypropylene (PP) and maleic acid-modified products thereof, ethylene-polypropylene copolymers and maleic acid-modified products thereof, polybutadiene resins and maleic anhydrate-modified products thereof, styrene-butadiene-styrene copolymers (SBS), styrene-ethylene-butadiene-styrene copolymers (SEBS), thermoplastic fluororesins, and thermoplastic polyester resins. These polymers can be formed into a sheet or film by being extruded with, for example, a resin extruder in accordance with a generally-used method. The thickness of the adhesive layer is not particularly limited, but is preferably small for the tire weight reduction. The thickness of 5 μm to 150 μm is preferable.

Hereinabove, the preferable embodiment of the present invention has been described in detail. It should be understood, however, that various alternations, substitutions and replacements can be made on the above-described embodiment without departing from the spirit and scope of the present invention defined by the attached claims.

EXAMPLES

Tires prepared for Examples 1 to 5 were pneumatic tires having the following structures. Specifically, each tire had a tire size of 235/50R17, and included: a carcass layer bridged between a pair of bead portions; and an inner liner layer disposed at a tire inner surface side of the carcass layer, the inner liner layer being made of a thermoplastic resin. The inner liner layer had a laminated structure including two kinds of film layers (a higher-melting-point film layer and a lower-melting-point film layer) having different melting points of the thermoplastic resin from each other. The lower-melting-point film layer was foamed to form multiple convex portions in the tire inner surface. For comparison, a tire including an inner liner layer made of a butyl rubber was prepared (Conventional Example).

The tires of Examples 1 to 5 had the maximum height of the convex portion, the melting point of the higher-melting-point film layer, the melting point of the lower-melting-point film layer, and the position of the lower-melting-point film layer, as shown in Table 1. As the thermoplastic resin forming the inner liner layer, used were nylon 11 (RILSAN-B, manufactured by Arkema Group: melting point of 185° C.), nylon 12 (RILSAN-A, manufactured by Arkema Group: melting point of 175° C.), and a copolymerized nylon (CM4001, manufactured by Toray Industries, Inc: melting point of 165° C.). The curing temperature was set to 180° C. In the tire of Example 5, a rubber layer was disposed at the tire inner surface side of the inner liner layer (refer to FIG. 3).

The cavity resonance sound of the above-described tires of Conventional Example and Examples 1 to 5 was measured according to the following measurement method. Table 1 shows the results.

Cavity Resonance Sound:

Each of the test tires was mounted on a wheel having a rim size of 17×7.5 JJ, and then inflated to an air pressure of 230 kPa. The tire and wheel was then mounted on a passenger vehicle with an engine displacement of 4.3 liters. A microphone was installed at a position on the window side of the driver seat in the vehicle compartment, so that the microphone was located close to an ear of a driver. The vehicle was run on a rough surface at a speed of 60 km/h to measure the noise (vibration transmissibility) in the vehicle compartment at that time. Then, the vibration transmissibility (dB) of a cavity resonance frequency (around 230 Hz) was calculated. Using the measured value of Conventional Example as reference, the evaluation results were expressed by a difference from the reference. A negative value means that the noise in the vehicle compartment is smaller than that of Conventional Example.

TABLE 1

|  | Conventional Example | Example 1 | Example 2 | Example 3 | Example 4 | Example 5 |
| --- | --- | --- | --- | --- | --- | --- |
| Maximum height of convex portion (mm) | — | 0.5 | 0.5 | 1.5 | 1.5 | 1.5 |
| Melting point of higher-melting-point film layer (° C.) | — | 185 | 185 | 185 | 185 | 185 |

TABLE 1-continued

|  | Conventional Example | Example 1 | Example 2 | Example 3 | Example 4 | Example 5 |
|---|---|---|---|---|---|---|
| Melting point of lower-melting-point film layer (° C.) | — | 175 | 175 | 175 | 165 | 165 |
| Position of lower-melting-point film layer | — | On carcass layer side | On tire inner surface side | On tire inner surface side | On tire inner surface side | On tire inner surface side |
| Presence/absence of rubber layer on inner surface | Absent | Absent | Absent | Absent | Absent | Present |
| Effect of reducing cavity resonance sound | Reference | −0.5 dB | −1.0 dB | −2.0 dB | −2.4 dB | −3.0 dB |

As apparent from Table 1, the tires of Examples 1 to 5 had a reduced cavity resonance sound in comparison with that of Conventional Example.

What is claimed is:

1. A pneumatic tire comprising:
a pair of bead portions;
a carcass layer bridged between the pair of bead portions; and
an inner liner layer disposed at a tire inner surface side of the carcass layer, the inner liner layer being made of any one of a thermoplastic resin and a thermoplastic elastomer composition that is obtained by blending a thermoplastic resin with an elastomer,
wherein the inner liner layer has a laminated structure including a plurality of film layers having different melting points of the thermoplastic resin from each other, and
a film layer having a lowest melting point of the thermoplastic resin is foamed to form a plurality of convex portions in the tire inner surface, and
wherein the film layer having the lowest melting point of the thermoplastic resin is disposed intermittently in a tire circumferential direction.

2. The pneumatic tire according to claim 1, wherein
a film layer having a highest melting point of the thermoplastic resin has a melting point set in a range of 175° C. to 250° C., and
a difference in melting point between the film layer having the highest melting point of the thermoplastic resin and the film layer having the lowest melting point of the thermoplastic resin is 5° C. or larger.

3. The pneumatic tire according to claim 1, wherein the film layer having the lowest melting point of the thermoplastic resin is kneaded with a filler.

4. The pneumatic tire according to claim 1, wherein
the film layer having the highest melting point of the thermoplastic resin is disposed closest to the carcass layer, and
the film layer having the lowest melting point of the thermoplastic resin is disposed farthest from the carcass layer.

5. The pneumatic tire according to claim 1, wherein a rubber layer is disposed at a tire inner surface side of the inner liner layer.

* * * * *